Figure 1:
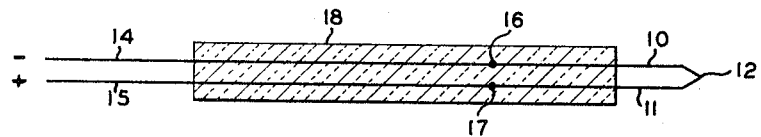
Figure 1:
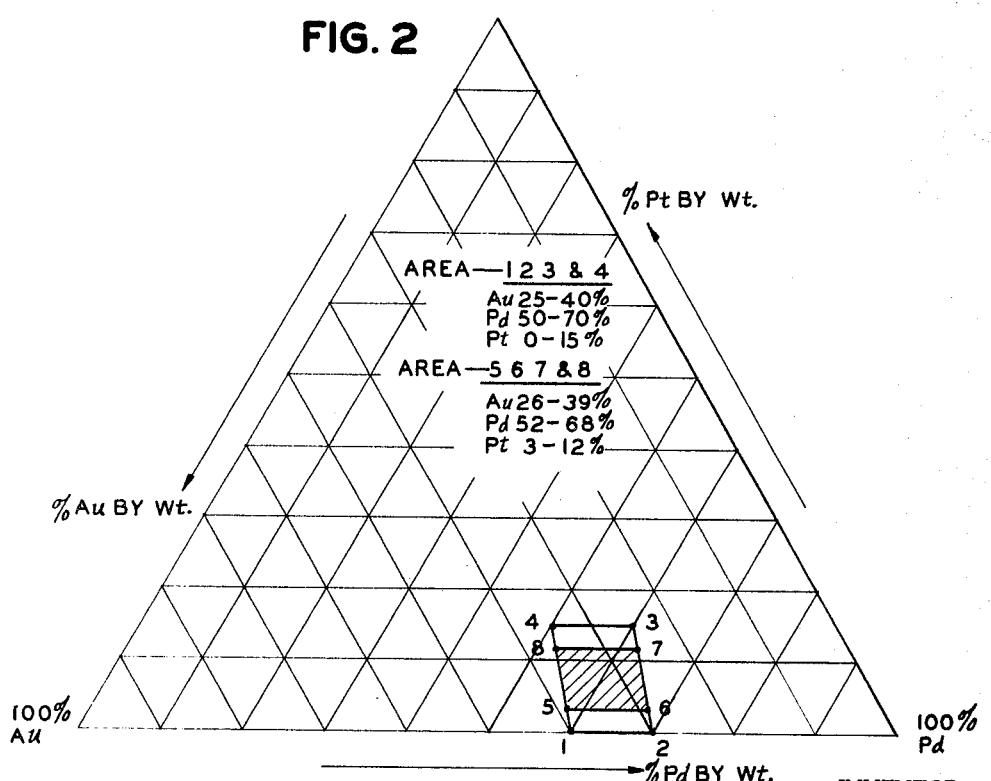

June 27, 1967  J. F. SCHNEIDER  3,328,209
NOBLE METAL THERMOCOUPLE HAVING BASE METAL COMPENSATING LEADS
Filed Jan. 7, 1963

INVENTOR.
JULIUS F. SCHNEIDER
BY John K. Conant
ATTORNEY

United States Patent Office 3,328,209
Patented June 27, 1967

3,328,209
NOBLE METAL THERMOCOUPLE HAVING BASE METAL COMPENSATING LEADS
Julius F. Schneider, Irvington, N.J., assignor to Engelhard Industries, Inc., Newark, N.J., a corporation of Delaware
Filed Jan. 7, 1963, Ser. No. 249,805
4 Claims. (Cl. 136—227)

The present invention relates to thermocouples and particularly to precious metal thermocouples for measuring extremely high temperatures.

Thermocouples comprising wires, referred to herewith as legs, of different alloys of precious metals coupled together for measuring high temperatures are well known. In accordance with the present invention, however, precious metal alloys have been found which make possible thermocouples having greatly improved response and performance characteristics.

It is an object of the present invention to provide a stable thermocouple with which to measure accurately temperatures in a range up to about 1425° C.

It is a further object to provide a thermocouple with a large response to temperature changes so that small changes are measured accurately with less sensitive, and hence less expensive, measuring instruments than have been required with previous thermocouples.

Another object is to provide a thermocouple having precious metal alloy legs attached to which are base metal alloy lead wires which will not distort the pattern of thermal-E.M.F. output from the precious metal alloy legs.

A thermocouple in accordance with this invention has an electromotive force (E.M.F.) output more than three or four times the E.M.F. output of conventional thermocouples for temperatures up to about 1425° C. The greatly increased E.M.F. output and increased response of this thermocouple to temperature change make possible finer and more accurate temperature readings with less sensitive instruments than heretofore possible. The large E.M.F. output and extent of response of the precious metal legs also reduce the effect of distortion of the output pattern of the legs even when base metal lead wires are used to connect the legs to the instruments for measuring the output of the thermocouple.

In addition, the thermocouples in accordance with this invention have good oxidation resistance and stable E.M.F. output and are therefore reliable for long periods of use within the temperature range contemplated, i.e. up to about 1425° C., without replacement or recalibration. They are particularly adapted for applications where accuracy and reliability for long periods at high temperatures are required. For example, they are well suited for use in connection with jet engines in which continuous and accurate measuring is desired for monitoring and adjusting the operation of the engines.

A conventional thermocouple now in wide use for measuring temperatures within the range contemplated by the present invention has a platinum leg coupled with a leg made of about 10% rhodium and the remainder platinum. This thermocouple has an output range from about 3 millivolts at 400° C. to about 14 millivolts at 1425° C. In contrast, a thermocouple in accordance with the present invention has an output range of about 15 to 69 millivolts, or about 5 times the output of the conventional type, in the same temperature range.

The measurement of the E.M.F. output of a particular metal referred to herein is a measurement made with reference to platinum. A wire made of the metal in question is joined to a platinum wire. Different degrees of heat are applied to the junction and the difference in potential between the two wires as measured by a voltmeter is taken as the E.M.F. output of the subject metal at the various temperatures.

The E.M.F. output of a couple between two metals other than platinum at a particular temperature is the difference between their E.M.F. outputs with respect to platinum at that temperature.

In accordance with the present invention, the precious metal alloys providing the improved thermal-E.M.F. characteristics described herein are as follows: For the negative legs, the precious metal alloy contains 25 to 40% gold, 50 to 70% palladium and 0 to 15% platinum; the positive legs consist of 25 to 90% platinum, 2 to 15% rhodium, and 0 to 70% palladium. These percentages are percentages by weight.

In view of the cost of the precious metal alloy wires for thermocouples of this invention, it is desirable to have the precious metal legs as short as possible and use base metal leads connected to the precious metal legs. But, the thermal-E.M.F. characteristics of the base metal leads must be such that they will not distort the pattern of E.M.F. output of the precious metal legs.

In the description which follows, the points at which the lead wires join the precious metal legs are referred to as the "tie-points." The junction of the precious metal legs, which is the point subjected to the temperature to be measured, is referred to as the "hot-point." Heat from the hot-point is conducted by the legs to the tie-points and the temperature at the tie-points will be less than, but proportionate to, the temperature at the hot-point.

To avoid distortion of the pattern of the thermal-E.M.F. output from the legs, lead wires are selected which, when considered as a couple, have approximately the same E.M.F. and response pattern as the legs for the range of temperatures expected at the tie-points. The E.M.F. output and pattern of change in response to temperature change of the lead wires and legs should be as nearly alike as possible for the range of temperatures contemplated. With respect to the precious metal alloy legs of the present invention, a variance of ±0.35 millivolt is very close matching and a variance up to about ±0.75 millivolt will not appreciably reduce the accuracy of the thermocouple.

The temperature to which the precious metal legs are subjected at the hot-point will, as mentioned above, be higher than the temperatures at the tie-points; but for the purpose of matching base metal lead wires to the precious legs, it is the response of the lead wires and legs to the temperatures encountered at the tie-points which is critical.

The exact temperature at the tie-points with respect to the temperature at the hot-point is, of course, determined by the length of the precious metal legs and the extent to which the tie-points are protected by insulation from heat other than the heat conducted through the legs.

Thermocouples in accordance with the present invention are particularly adapted for accurately measuring temperatures up to about 1425° C. When the hot-point is at a temperature in the neighborhood of 1400° C. the tie-points will be, or may be arranged to be, about 400° C. to 700° C. cooler. Accordingly, a group of suitable base metal alloy lead wires have been found whose E.M.F. pattern of responses corresponds closely to the pattern of responses of the legs of this invention in the range of temperatures from about 500° C. to 1000° C.

These base metal alloys are: for the negative lead wire—78.5 to 98.5% nickel, 1 to 5% aluminum, 0.5 to 1.5% silicon, and 0 to 15% copper; for the positive lead wire—33 to 85% nickel, 10 to 20% chromium, 0 to 45% iron, 0 to 1.5% silicon, and 0 to 0.5% manganese.

The E.M.F. response of some of these base metal lead wires more closely matches the E.M.F. response of the legs than others at a particular temperature in the range of 500° C. to 1000° C. The ones preferably used are those which most closely match the E.M.F. output of the legs at the temperatures of the tie-points when the temperature at the hot-point is within the particular range of temperatures, up to about 1425° C., in which the thermocouple is intended to be used.

Further objects and advantages of thermocouples in accordance with the present invention will be apparent from the following description and accompanying drawings in which:

FIGURE 1 is a side view partly in section of a thermocouple in accordance with the present invention, and FIGURE 2 is a graphic representation of a composition range of alloys for the negative leg of a thermocouple of the present invention.

Referring to FIGURE 1, a thermocouple in accordance with the present invention comprises generally a negative leg 10 and a positive leg 11 fused together at 12 which is the hot-point. The hot-point is the portion of the thermocouple subjected to the heat to be measured. Attached to the legs 10 and 11 are lead wires 14 and 15 to measuring instruments such as voltmeters, and galvanometers, not shown. The lead wires 14 and 15 are attached to the legs 10 and 11 respectively at the tie-points 16 and 17. An insulating and protective sheath 18 covers a portion of the legs 10 and 11 and leads 14 and 15 as shown. The sheath 18 is normally a jacket of a refractory metal filled with an insulating material, such as magnesia or alumina, which holds the legs and lead wires spaced apart and insulated from each other inside the sheath.

The precious metal alloys for the negative leg of a thermocouple of this invention are alloys of gold (Au), palladium (Pd) and platinum (Pt) in the proportions by weight of 25 to 40% Au, 50 to 70% Pd and 0 to 15% Pt.

The composition range of these precious metal alloys for the negative leg is illustrated in FIGURE 2 which is a triangular coordinate graph. Through the particular composition of legs 10 and 11 and the lead wires 14 and 15 all contribute to the characteristics of the thermocouple, the composition of the negative legs is the most significant for determining and adjusting the characteristics of a thermocouple in accordance with the present invention.

Referring to FIGURE 2 the area of the graph within the numerals 1, 2, 3 and 4 represents the composition ranges of negative leg alloys of gold, palladium and platinum for improved high temperature thermocouples of this invention. The composition of the negative leg is varied within the range of area 1, 2, 3 and 4 according to specific characteristics desired. In general, the limit of gold is about 40% since more than this tends to reduce the melting point of the leg to a point at which it would be unsatisfactory for the high temperatures contemplated. The practical upper limit of palladium is about 70% because more would reduce the desirable high E.M.F. response of the leg.

As indicated, the range of platinum in the negative leg is from 0 to 15%. More reduces adversely the E.M.F. output. The platinum is included to provide strength and resistance against vibration, but for some applications, such as measuring furnace temperatures, the thermocouple would not be subjected to appreciable stress or vibration and platinum may be left out of the alloy. Thermocouples used for monitoring the temperatures in jet engines, however, must be able to withstand stress and vibration; hence, platinum is incorporated in the alloy. In the graph of FIGURE 2, the negative leg alloys which are particularly adapted for use with jet engines are indicated by the area within the numerals 5, 6, 7 and 8 which graphically represent negative leg alloys containing 26 to 39% gold, 52 to 68% palladium and 3 to 12% platinum.

The positive leg 11 is an alloy of palladium (Pd), platinum (Pt) and rhodium (Rh) in the proportions 0 to 70% Pd, 25 to 90% Pt, and 2 to 15% Rh.

Tables showing the E.M.F. output of examples of the above alloys coupled to platinum at various temperatures are as follows:

TABLE I.—NEGATIVE LEG E.M.F. IN MILLIVOLTS

| Alloy | Au, Percent | Pd, Percent | Pt, Percent | 400° C. | 600° C. | 800° C. | 1,000° C. | 1,200° C. | 1,400° C. | 1,425° C. |
|---|---|---|---|---|---|---|---|---|---|---|
| 1 | 30 | 70 | 0 | −8.14 | −13.70 | −19.88 | −26.53 | −32.87 | −39.25 | −40.15 |
| 2 | 40 | 60 | 0 | −10.07 | −17.04 | −24.66 | −32.41 | −40.07 | −47.37 | −48.26 |
| 3 | 39 | 58.5 | 2.5 | −8.67 | −14.91 | −21.82 | −29.00 | −36.15 | −43.06 | −43.92 |
| 4 | 38.2 | 57.3 | 4.5 | −7.79 | −13.56 | −20.08 | −26.90 | −33.60 | −40.30 | −41.12 |
| 5 | 38 | 57 | 5 | −7.58 | −13.20 | −19.60 | −26.30 | −33.00 | −39.55 | −40.35 |
| 6 | 37 | 55.5 | 7.5 | −6.74 | −11.82 | −17.70 | −23.90 | −30.17 | −36.39 | −37.15 |
| 7 | 36.9 | 55.4 | 7.7 | −6.67 | −11.70 | −17.54 | −23.70 | −29.96 | −36.13 | −36.89 |
| 8 | 37 | 55 | 8 | −6.58 | −11.52 | −17.29 | −23.41 | −29.64 | −35.74 | −37.49 |
| 9 | 36 | 54 | 10 | −5.89 | −10.46 | −15.82 | −21.60 | −27.50 | −30.31 | −34.02 |

TABLE II.—POSITIVE LEG E.M.F. IN MILLIVOLTS

| Alloy | Pd | Pt | Rh | 400° C. | 600° C. | 800° C. | 1,000° C. | 1,200° C. | 1,400° C. | 1,425° C. |
|---|---|---|---|---|---|---|---|---|---|---|
| 10 | 0 | 90 | 10 | +3.25 | +5.22 | +7.33 | +9.57 | +11.93 | +14.34 | +14.64 |
| 11 | 0 | 87 | 13 | +3.40 | +5.56 | +7.93 | +10.47 | +13.19 | +15.97 | +16.32 |
| 12 | 38 | 57 | 5 | +4.17 | +6.90 | +9.74 | +12.67 | +15.58 | +18.40 | +18.73 |
| 13 | 57 | 38 | 5 | +4.75 | +7.66 | +10.60 | +13.43 | +16.08 | +18.45 | +18.77 |
| 14 | 61 | 33 | 6 | +5.00 | +7.96 | +11.00 | +13.86 | +16.55 | +18.91 | +19.23 |
| 15 | 60 | 32 | 8 | +5.20 | +8.42 | +11.71 | +14.94 | +18.02 | +20.81 | +21.10 |

The E.M.F. output of a thermocouple formed by coupling an alloy of Table I with an alloy of Table II at a particular temperature is the difference between the E.M.F. output of each of the alloys at the given temperature. For example, at 1000° C. the E.M.F. output of a couple between alloys 1 and 14 forming the negative and positive legs of a thermocouple is 40.39.

As previously mentioned lead wires such as lead wires 14 and 15 are normally used to connect the legs 10 and 11 to a voltmeter or other measuring instrument. In order to have the measurements recorded by the measuring instrument distorted as little as possible lead wires are selected whose E.M.F. characteristics match as nearly as possible the E.M.F. characteristics of the legs at the temperature expected at the tie-points 16 and 17.

For a thermocouple in accordance with the present invention which is intended to measure temperatures in a range up to about 1425° C., lead wires 14 and 15 whose total E.M.F. output does not vary more than about ±0.75 millivolt from the E.M.F. output of the legs 10 and 11 at temperatures from about 500° to 1000° C. are preferable.

Base metal alloys which are particularly suitable are: for the negative leg—78.5 to 98.5% nickel (Ni), 1 to 5% aluminum (Al), .5 to 1.5% silicon (Si) and 0 to 15% copper (Cu); and for the positive leg—33 to 85% nickel (Ni), 10 to 20% chromium (Cr), 0 to 45% iron (Fe), 0 to 1.5% silicon (Si), and 0 to 0.5% manganese (Mn).

Tables III and IV showing the E.M.F. output in millivolts of examples of the above alloys coupled to platinum at temperatures from 400° C. to 1000° C. are as follows:

As seen in this Table V the legs and leads of thermocouples A to F are closely matched over the entire range from 500° to 1000° C. As referred to herein it is considered a close match when the difference in E.M.F. output between the legs and leads is less than about ±0.75

TABLE III.—NEGATIVE LEAD E.M.F. IN MILLIVOLTS

| Alloy | Ni | Al | Si | Cu | 400° C. | 500° C. | 600° C. | 700° C. | 800° C. | 900° C. | 1,000° C. |
|---|---|---|---|---|---|---|---|---|---|---|---|
| 16 | 96 | 3 | 1 | 0 | −5.32 | −6.79 | −8.35 | −9.96 | −11.61 | −13.25 | −14.84 |
| 17 | 92 | 3 | 1 | 4 | −6.26 | −8.07 | −9.93 | −11.81 | −13.73 | −15.62 | −17.43 |
| 18 | 90.6 | 3 | 1 | 5.4 | −6.53 | −8.38 | −10.31 | −12.30 | −14.28 | −16.24 | −18.14 |
| 19 | 90 | 3 | 1 | 6 | −6.73 | −8.63 | −10.65 | −12.68 | −14.71 | −16.73 | −18.69 |
| 20 | 87 | 3 | 1 | 9 | −7.35 | −9.45 | −11.60 | −13.83 | −16.05 | −18.12 | −20.25 |
| 21 | 86.4 | 3 | 1 | 9.6 | −7.58 | −9.73 | −11.84 | −14.15 | −16.39 | −18.58 | −20.70 |

TABLE IV.—POSITIVE LEAD E.M.F. IN MILLIVOLTS

| Alloy | Ni | Cr | Fe | Si | Mn | 400° C. | 500° C. | 600° C. | 700° C. | 800° C. | 900° C. | 1,000° C. |
|---|---|---|---|---|---|---|---|---|---|---|---|---|
| 22 | 77 | 16 | 7 | 0 | 0 | +7.3 | +9.67 | +12.20 | +14.99 | +17.81 | +20.80 | +23.60 |
| 23 | 78.6 | 20 | 00 | 1.3 | 0.1 | +6.59 | +8.82 | +11.04 | +13.56 | +16.09 | +18.80 | +21.71 |
| 24 | 65 | 15 | 20 | 0 | 0 | +5.00 | +6.84 | +8.60 | +10.80 | +13.00 | +15.47 | +18.00 |
| 25 | 60 | 15 | 23.6 | 1.3 | 0.1 | +4.93 | +6.78 | +8.56 | +10.74 | +12.89 | +15.37 | +17.90 |
| 26 | 35 | 20 | 45 | 0 | 0 | +3.50 | +4.70 | +6.20 | +7.80 | +9.60 | +11.72 | +14.02 |
| 27 | 35 | 20 | 43.6 | 1.3 | 0.1 | +3.36 | +4.62 | +6.12 | +8.80 | +9.52 | +11.55 | +13.65 |

Table V below gives examples of six thermocouples in accordance with this invention comprising pairs of lead wires of alloys from Tables III and IV matched with pairs of legs of precious metal alloys from Tables I and II. The E.M.F. responses of the legs and lead wires are compared at temperatures from 500° to 1000° C. and the differences are given. The temperature at the tie-points 16 and 17 will be, or may easily be arranged to be, in this range when the hot-point 12 is at from about 1000° C. to 1425° C. which is the approximate range of temperature within which thermocouples of this invention are particularly adapted to be used. The relationship of the temperature at the tie-points 16 and 17 to the temperature at the hot-point 12 may be varied by varying the length of the legs 10 and 11 and by the selection and arrangement of insulation for the tie-points 16 and 17.

When the structure and arrangement of the thermocouple with respect to the heat source is decided upon, the temperature at the tie-points 16 and 17 relative to the temperature at the hot-point 12 may be determined. A lead wire and leg combination may then be selected with reference to a particular temperature at which it is desired to have the thermocouple as accurate as possible. This is explained subsequently in more detail with reference to the examples in the following Table V.

millivolt. When the difference is within these bounds the distortion caused by the lead wire would not noticeably effect the accuracy of measurements of the E.M.F. responses of the precious metal legs of this invention and the thermocouple would still be within acceptable limits of accuracy for the uses contemplated—i.e. monitoring operating temperatures of jet or rocket engines or monitoring the furnace temperatures in the manufacture of metals and alloys.

As exemplified by the combinations of lead wires and legs set forth in the above Table V each combination has a "cross-over" point, which is the tie-point temperature at which the E.M.F. output of the lead wires 14 and 15 exactly equal the E.M.F. output of the precious metal legs 10 and 11. As indicated, when the E.M.F. output of the lead wires is greater than the E.M.F. output of the legs at a given temperature the difference in E.M.F. is positive. Conversely when it is less, the difference is negative. The "cross-over" point is therefore the point at which the E.M.F. difference is ±0 as the tie-point temperature changes from a level at which the E.M.F. difference is positive to a level at which it is negative or vice versa. The thermocouple is then most accurate at the temperature at which the tie-point temperature is the "cross-over" point and this factor is important in select- TABLE V.—COMPARISON OF E.M.F. IN MILLIVOLTS OF LEGS COUPLES AND LEAD WIRE COUPLES

| Thermocouple | | Alloys | 500° C. | 600° C. | 700° C. | 800° C. | 900° C. | 1,000° C. |
|---|---|---|---|---|---|---|---|---|
| A | Leg | 14 x 1 | 17.43 | 21.66 | 26.24 | 30.88 | 35.53 | 40.39 |
| | Lead | 23 x 19 | 17.45 | 21.69 | 26.24 | 30.80 | 35.53 | 40.40 |
| | Difference in E.M.F. | | +0.02 | +0.03 | ±0 | −0.08 | ±0 | +0.01 |
| B | Leg | 12 x 8 | 14.41 | 18.39 | 22.74 | 27.03 | 31.52 | 36.08 |
| | Lead | 25 x 18 | 15.16 | 18.87 | 23.04 | 27.17 | 31.61 | 36.04 |
| | Difference in E.M.F. | | +0.75 | +0.48 | +0.30 | +0.14 | +0.09 | −0.04 |
| C | Leg | 12 x 7 | 14.72 | 18.60 | 22.94 | 27.28 | 31.83 | 36.37 |
| | Lead | 24 x 18 | 15.22 | 18.91 | 23.10 | 27.28 | 31.71 | 36.14 |
| | Difference in E.M.F. | | +0.50 | +0.31 | +0.16 | ±0 | −0.12 | −0.23 |
| D | Leg | 12 x 6 | 14.81 | 18.72 | 23.08 | 27.44 | 32.00 | 36.57 |
| | Lead | 25 x 18 | 15.16 | 18.87 | 23.04 | 27.17 | 31.61 | 36.04 |
| | Difference in E.M.F. | | +0.25 | +0.15 | −0.04 | −0.27 | −9.39 | −0.53 |
| E | Leg | 10 x 4 | 14.91 | 18.78 | 23.10 | 27.41 | 31.94 | 36.47 |
| | Lead | 24 x 18 | 15.22 | 18.91 | 23.10 | 27.28 | 31.71 | 36.14 |
| | Difference in E.M.F. | | +0.31 | +0.13 | ±0 | −0.13 | −0.23 | −0.33 |
| F | Leg | 12 x 9 | 13.55 | 17.36 | 21.37 | 25.56 | 29.80 | 34.27 |
| | Lead | 26 x 20 | 14.15 | 17.80 | 21.63 | 25.65 | 29.84 | 34.27 |
| | Difference in E.M.F. | | +0.60 | +0.44 | +0.26 | +0.09 | +0.04 | ±0 | ing a thermocouple in accordance with the present invention to meet narrow specifications of accuracy. For example, if in a particular operation it is important to know as accurately as possible when a temperature of 1200° C. is reached—in a jet engine or a furnace for example—and the structure and arrangement of the thermocouple is such that the difference in temperature between the hot-point 12 and the tie-points 16 and 17 is about 400° C. then thermocouple C from Table V would be particularly suitable for its cross-over point is 800° which would be the temperature at the tie-points when the hot-point is at 1200° C.

As seen in Table V the lead wire and leg combination, thermocouple A, does not exhibit a distinct cross over point but fluctuates around zero with the maximal deviations of ±0.03 and −0.08. The leg and lead elements may be considered as practically identical as far as the E.M.F. between 500 and 1000° C. is concerned. The combinations B, C, D, E and F, however, exhibit a distinct cross over point at 960, 800, 675, 700 and 1000° C., respectively. A thermocouple having a particular cross-over point may be provided by selecting an appropriate combination of legs and lead wires from those set forth in Tables I to IV and by slight variations in the composition of the legs. In practice, as previously mentioned, fine adjustment of characteristics may satisfactorily be made by varying the composition of the negative leg.

Referring to Table I the composition of leg alloys 8, 7 and 6 which are used for the negative legs of thermocouples B, C and D of Table V was varied by varying the platinum content from 8 to 7.7 to 7.5% respectively and making up the difference principally by increasing the palladium content.

Thermocouples having legs and lead wires of the above described alloys in accordance with the present invention are, as previously mentioned, particularly adapted for measuring temperatures in the range from about 1000° C. to 1425° C. At these high temperatures the precious metal alloys of this invention have good oxidation resistance and have high E.M.F. output and relatively large change in E.M.F. output per degree of temperature change compared with previously known thermocouples used in the same high temperature range.

It will be appreciated that certain modifications may be made in the structure and elements of the thermocouples and thermocouple alloys described herein without departing from the scope of the invention defined in the following claims.

What is claimed is:

1. A thermocouple comprising a negative leg wire composed of 25 to 40% gold, 50 to 70% palladium, and 0 to 15% platinum by weight and a positive leg wire composed of 0 to 70% palladium, 25 to 90% platinum, and 2 to 15% rhodium by weight, having connected to said negative leg a lead wire composed of 78.5 to 98.5% nickel, 1 to 5% aluminum, 0.5 to 1.5% silicon, and 0 to 15% copper by weight and having connected to said positive leg a lead wire composed of 33 to 85% nickel, 10 to 20% chromium, 0 to 45% iron, 0 to 1.5% silicon and 0 to 0.5% manganese by weight.

2. A thermocouple comprising a negative leg composed of 26 to 39% gold, 52 to 68% palladium, and 3 to 12% platinum by weight; a lead wire connected to said negative leg and composed of 78.5 to 98.5% nickel, 1 to 5% aluminum, 0.5 to 1.5% silicon and 0 to 15% copper by weight, a positive leg composed of 0 to 70% palladium, 25 to 90% platinum, and 2 to 15% rhodium by weight; and a lead wire connected to said positive leg and composed of 33 to 85% nickel, 10 to 20% chromium, 0 to 45% iron, 0 to 1.5% silicon and 0 to 0.5% manganese by weight.

3. A thermocouple comprising a negative leg composed of 30 to 40% gold and 60 to 70% palladium by weight and a positive leg composed of 0 to 70% palladium, 25 to 90% platinum and 2 to 15% rhodium by weight, having connected to said negative leg a lead wire composed of 78.5 to 98.5% nickel, 1 to 5% aluminum, 0.5 to 1.5% silicon, and 0 to 15% copper by weight, and having connected to said positive leg a lead wire composed of 33 to 85% nickel, 10 to 20% chromium, 0 to 45% iron, 1.5% silicon and 0 to 0.5% manganese.

4. A thermocouple comprising a negative leg composed of 27 to 40% gold, 53 to 70% palladium, and 0 to 10% platinum by weight; a lead wire connected to said negative leg and composed of 85 to 93% nickel, 2 to 4% aluminum, 0.5 to 1.5% silicon, and 2 to 10% copper by weight; a positive leg composed of 0 to 65% palladium, 30 to 90% platinum, and 5 to 10% rhodium by weight; and a lead wire connected to said positive leg and composed of 33 to 80% nickel, 15 to 20% chromium, 0 to 45% iron, 0 to 1.5% silicon, and 0 to 0.5% manganese by weight.

References Cited

UNITED STATES PATENTS

| | | | |
|---|---|---|---|
| 1,025,715 | 5/1912 | Peake | 136—227 X |
| 1,789,733 | 1/1931 | Feuszer | 75—172 X |
| 2,466,202 | 4/1949 | Brenner | 136—227 |
| 2,705,747 | 4/1955 | Strange | 136—236 X |
| 2,757,221 | 7/1956 | Guettel | 136—236 X |
| 3,007,988 | 11/1961 | Jaffe et al. | 136—227 |

OTHER REFERENCES

Reference Data for Radio Engineers, 1943, pages 25 and 26.

Sosman, R. S.: Pyrometry of Solids, 1940, pages 12 and 13.

WINSTON A. DOUGLAS, *Primary Examiner.*

A. M. BEKELMAN, *Assistant Examiner.*